United States Patent
Kato

(10) Patent No.: US 7,031,852 B2
(45) Date of Patent: Apr. 18, 2006

(54) APPARATUS AND METHOD FOR DETECTING ABNORMALITY OF A VIBRATION-TYPE ANGULAR VELOCITY SENSOR, ABNORMALITY DETECTING PROGRAM, AND A RELATED VEHICLE CONTROL SYSTEM

(75) Inventor: Kenji Kato, Okazaki (JP)

(73) Assignee: Denso Corporation, Kariya (JP)

(*) Notice: Subject to any disclaimer, the term of this patent is extended or adjusted under 35 U.S.C. 154(b) by 63 days.

(21) Appl. No.: 10/808,521

(22) Filed: Mar. 25, 2004

(65) Prior Publication Data

US 2004/0204872 A1    Oct. 14, 2004

(30) Foreign Application Priority Data

Mar. 27, 2003    (JP) ............................ 2003-088957

(51) Int. Cl.
 *G06F 19/00*    (2006.01)
 *G07C 19/00*    (2006.01)
(52) U.S. Cl. ................. 702/56; 73/504.12; 73/504.16; 702/141; 702/146
(58) Field of Classification Search ................. 702/56, 702/33, 104, 146, 150, 141; 73/504.12, 504.15, 73/660; 310/316.01; 180/422
See application file for complete search history.

(56) References Cited

U.S. PATENT DOCUMENTS

| | | | | |
|---|---|---|---|---|
| 5,908,986 A * | 6/1999 | Mitamura | ................ | 73/504.12 |
| 6,418,790 B1 * | 7/2002 | Yukawa et al. | .......... | 73/504.12 |
| 6,584,841 B1 * | 7/2003 | Ichinose et al. | ......... | 73/504.12 |

FOREIGN PATENT DOCUMENTS

| | | |
|---|---|---|
| JP | 3-159877 | 7/1991 |
| JP | 4-326065 | 11/1992 |
| JP | 11-064376 | 3/1999 |
| JP | 2000-292432 | 10/2000 |
| JP | 2001-264132 | 9/2001 |

* cited by examiner

*Primary Examiner*—Michael Nghiem
*Assistant Examiner*—John Le
(74) *Attorney, Agent, or Firm*—Posz Law Goup, PLC

(57) ABSTRACT

An acceleration sensor, installed together with an angular velocity sensor in the same casing, detects the acceleration induced by the external vibration. Its detection signal Vs is supplied to first and second band-pass filters to extract a driving system resonance frequency fd of the angular velocity sensor as well as a difference frequency $\Delta f$ between the driving system frequency component and a sensing system resonance frequency. The extracted signals Vs1 and Vs2 of respective frequency components are supplied to first and second window comparators. When each frequency component deviates from a predetermined range, a diagnostic signal Vd notifying the abnormal condition of the angular velocity sensor is produced.

12 Claims, 4 Drawing Sheets

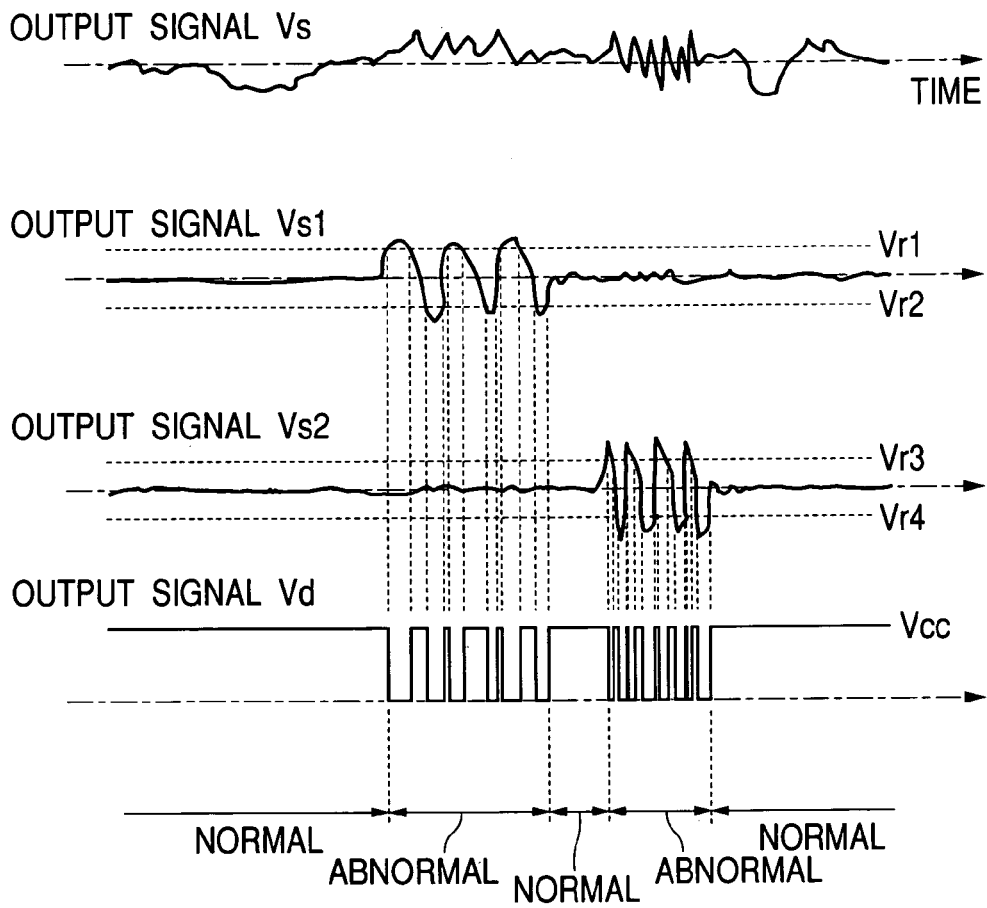
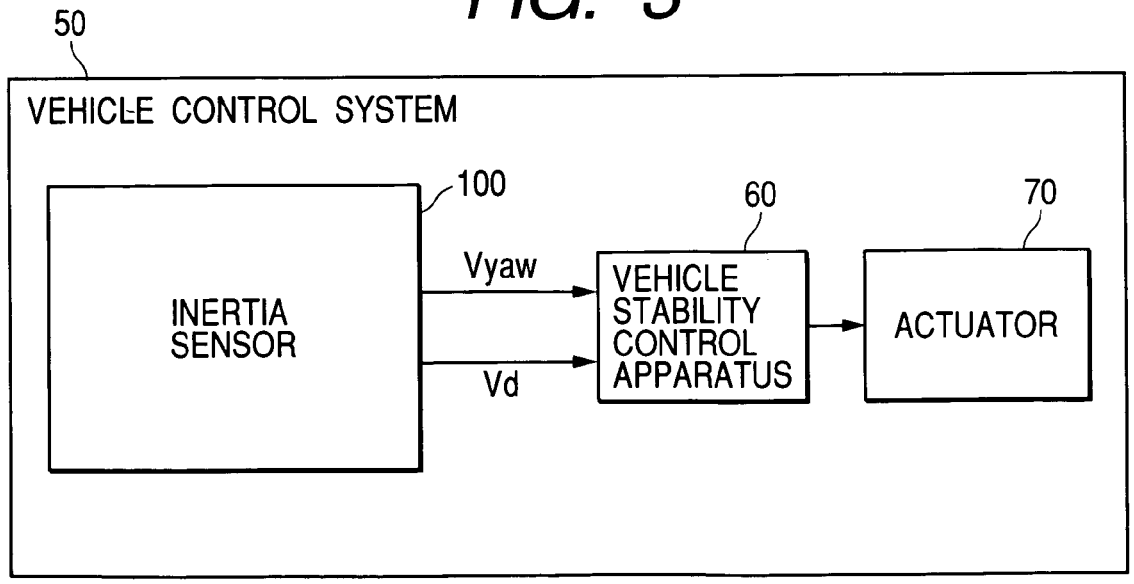

APPARATUS AND METHOD FOR DETECTING ABNORMALITY OF A VIBRATION-TYPE ANGULAR VELOCITY SENSOR, ABNORMALITY DETECTING PROGRAM, AND A RELATED VEHICLE CONTROL SYSTEM

BACKGROUND OF THE INVENTION

The present invention relates to an abnormality detecting apparatus, an abnormality detecting method, and an abnormality detecting program for a vibration-type angular velocity sensor that detects an abnormal condition of the vibration-type angular velocity sensor, and also related to a vehicle control system incorporating the abnormality detecting apparatus.

A conventional vehicle control system using an angular velocity sensor to maintain the vehicle in a normal condition is, for example, a vehicle stability control system that optimizes the brake force or torque of respective wheels in response to detection of side slipping of the vehicle or a 4-wheel steering angle control system that controls the steering angle of rear and/or front wheels of the vehicle.

This kind of conventional control system requires a yaw rate signal representing the side slipping of the vehicle as an abnormal condition of the vehicle. The angular velocity sensor produces the yaw rate signal. When the yaw rate signal is abnormal, there is the possibility that the vehicle may cause unpredictable behavior and accordingly the traveling characteristics of the vehicle become unstable.

To solve the above problem, the Japanese Patent No. 2504233 proposes the following technique (refer to page 2, right column, line 45 to page 3, left column, line 46 and FIG. 1).

For example, if a traveling vehicle rides on a relatively large pebble lying on a road, the vehicle will be subjected to a large shock. In such a case, the angular velocity sensor installed in the vehicle will receive a large shock, too. The processing circuit of the angular velocity sensor will saturate in signal processing due to this shock and, as a result, will produce a signal different or deviated far from the inherent yaw rate signal of the vehicle.

In view of the above, the Japanese Patent No. 2504233 checks whether or not the processing circuit signal of the angular velocity sensor exceeds a predetermined level, and then notifies the abnormality of the angular velocity sensor to the vehicle control system when the processing circuit signal exceeds the predetermined level. Thus, the overall control system can be stabilized.

Hereinafter, the conventional abnormality sensing system disclosed in the Japanese Patent No. 2504233 will be explained with reference to FIG. 6. FIG. 6 is a circuit diagram showing a conventional angular velocity sensor and peripheral circuit arrangement disclosed in this prior art.

When an excessive shock is applied on an angular velocity sensor 501, the angular velocity sensor 501 vibrates and accordingly an angular velocity, i.e., a yaw rate (a rotating speed of the vehicle about a vertical axis) is generated. Two piezoelectric sensing elements 506 and 507 detect this yaw rate and generate a yaw rate signal.

In a case that an excessive shock or acceleration is input, the piezoelectric sensing elements 506 and 507 produce a signal having a higher peak value compared with an ordinary signal level. As a result, an AC amplifier 512 produces an output voltage $V_1$ having an abnormal peak value. The judging means 516 including two window comparators 516a and 516b makes a judgment as to whether or not the output voltage $V_1$ is within a predetermined range, and outputs a READY signal $V_4$ representing the judgment result.

However, the specific occasion that the produced signal is different or deviates far from the inherent vehicle yaw rate is not limited to the application of such an excessive shock. For example, the angular velocity sensor may receive the vibration containing the components of a driving system resonance frequency fd of a vibrator element placed in the vibration-type angular velocity sensor, its odd-number harmonics 3fd, 5fd, - - - , and a difference frequency ($\Delta f=|fd-fs|$) between the driving system resonance frequency fd and a sensing system resonance frequency fs. In such cases, the angular velocity sensor possibly produces a signal different or deviated far from the inherent vehicle yaw rate. Especially, in a case that the angular velocity sensor receives the vibration including a frequency component corresponding to $\Delta f$ in the case that fd or a mechanical Q value of the sensing system is high, there is the higher possibility that the angular velocity sensor may produce an abnormality signal even when the vibration level is low.

This is believed that the processing circuit of the angular velocity sensor cannot discriminate between an actual angular velocity signal and a signal derived from the vibration of the above-described frequency component. According, for example, as disclosed in the Japanese Patent No. 3037774, it is possible to enhance or optimize the vibration-proof structure of a vibrator element placed in the angular velocity sensor so that the vibration containing a frequency band causing an abnormality signal cannot be input into the angular velocity sensor (refer to paragraphs [0007] and [0008] and FIG. 1).

However, if it is required to consider the possibility that the angular velocity sensor may further receive the vibration having a wide frequency band causing the abnormality signal or the possibility that the vibration-proof structure may deteriorate some day, the above-described conventional technique will be insufficient in that the angular velocity sensor may be adversely influenced by the frequency band causing an erroneous output.

SUMMARY OF THE INVENTION

In view of the above-described problems, the present invention has an object to provide an abnormality detecting apparatus, an abnormality detecting method, and an abnormality detecting program for a vibration-type angular velocity sensor and a related vehicle control system that can detect the abnormal condition leading to malfunction of the angular velocity sensor, thereby improving the safety of the vehicle control system and further simplifying the vibration-proof structure of the angular velocity sensor.

In order to accomplish the above and other related objects, the present invention provides an abnormality detecting apparatus for a vibration-type angular velocity sensor that detects an abnormal condition of the vibration-type angular velocity sensor, including a frequency component extracting means and a judging means. The frequency component extracting means extracts a specific frequency component having the possibility that the angular velocity sensor may produce an erroneous output based on an acceleration signal detected by an acceleration sensor disposed in the vicinity of the vibration-type angular velocity sensor. And, the judging means compares a level of the specific frequency component extracted by the frequency component extracting means with a predetermined level and produces a signal notifying of an abnormal condition of the angular velocity sensor when the level of the specific frequency component is larger than the predetermined level.

With this arrangement, the specific frequency component where the angular velocity sensor may produce an erroneous output can be extracted based on an output of the acceleration sensor. When the level of this specific frequency component exceeds the predetermined value, the angular velocity sensor is judged as being abnormal. Thus, it becomes possible to improve the safety of the vehicle control system and simplify the vibration-proof structure of the angular velocity sensor.

Furthermore, according to a preferable embodiment of the abnormality detecting apparatus for a vibration-type angular velocity sensor in accordance with the present invention, the specific frequency component having the possibility that the angular velocity sensor may produce an erroneous output is a driving system resonance frequency relating to a driving system of the angular velocity sensor and/or a difference frequency between the driving system resonance frequency and a sensing system resonance frequency relating to a sensing system of the angular velocity sensor.

With this arrangement, it becomes possible to discriminate between the actual angular velocity signal and the signal derived from the vibration of the specific frequency component having the higher possibility that the angular velocity sensor may produce an erroneous output (i.e., the driving system resonance frequency relating to the driving system of the angular velocity sensor, or the difference frequency between the driving system resonance frequency and the sensing system resonance frequency).

Furthermore, according to a preferable embodiment of the abnormality detecting apparatus for a vibration-type angular velocity sensor in accordance with the present invention, the vibration-type angular velocity sensor and the acceleration sensor are installed in the same casing.

With this arrangement, the acceleration applied on the vibration-type angular velocity sensor can be surely detected by the acceleration sensor, while the abnormal condition of the angular velocity sensor can be accurately detected.

Furthermore, to accomplish the above and other related objects, the present invention provides an abnormality detecting method for a vibration-type angular velocity sensor that detects an abnormal condition of the vibration-type angular velocity sensor, including a step of extracting a specific frequency component having the possibility that the angular velocity sensor may produce an erroneous output based on an acceleration signal detected by an acceleration sensor disposed in the vicinity of the vibration-type angular velocity sensor, and a step of comparing a level of the extracted specific frequency component with a predetermined level and producing a signal notifying of an abnormal condition of the angular velocity sensor when the level of the specific frequency component is larger than the predetermined level.

With this method, the specific frequency component where the angular velocity sensor may produce an erroneous output can be extracted based on an output of the acceleration sensor. When the level of this specific frequency component exceeds the predetermined value, the angular velocity sensor is judged as being abnormal. Thus, it becomes possible to improve the safety of the vehicle control system and simplify the vibration-proof structure of the angular velocity sensor.

Furthermore, according to a preferable embodiment of the abnormality detecting method for a vibration-type angular velocity sensor in accordance with the present invention, the specific frequency component having the possibility that the angular velocity sensor may produce an erroneous output is a driving system resonance frequency relating to a driving system of the angular velocity sensor and/or a difference frequency between the driving system resonance frequency and a sensing system resonance frequency relating to a sensing system of the angular velocity sensor.

With this method, it becomes possible to discriminate between the actual angular velocity signal and the signal derived from the vibration of the specific frequency component having the higher possibility that the angular velocity sensor may produce an erroneous output (i.e., the driving system resonance frequency relating to the driving system of the angular velocity sensor, or the difference frequency between the driving system resonance frequency and the sensing system resonance frequency).

Furthermore, according to a preferable embodiment of the abnormality detecting method for a vibration-type angular velocity sensor in accordance with the present invention, the vibration-type angular velocity sensor and the acceleration sensor are installed in the same casing.

With this method, the acceleration applied on the vibration-type angular velocity sensor can be surely detected by the acceleration sensor, while the abnormal condition of the angular velocity sensor can be accurately detected.

Furthermore, according to a preferable embodiment of the abnormality detecting method for a vibration-type angular velocity sensor in accordance with the present invention, the above steps of the abnormality detecting method are executed by an electric circuit having the capability of executing hardware processing or by a computer having the capability of executing software processing according to a predetermined algorithm.

With this method, it becomes possible to extract the specific frequency component having the possibility that the angular velocity sensor may produce an erroneous output based on the output of the acceleration sensor obtained by the hardware processing or the software processing. When the level of this specific frequency component exceeds the predetermined value, the angular velocity sensor is judged as being in the abnormal condition.

Furthermore, the present invention provides an abnormality detecting program executed in a computer for realizing an abnormality detecting method for a vibration-type angular velocity sensor that detects an abnormal condition of the vibration-type angular velocity sensor. The abnormality detecting method includes a step of extracting a specific frequency component having the possibility that the angular velocity sensor may produce an erroneous output based on an acceleration signal detected by an acceleration sensor disposed in the vicinity of the vibration-type angular velocity sensor, and a step of comparing a level of the specific frequency component extracted in the frequency component extracting step with a predetermined level and producing a signal notifying of an abnormal condition of the angular velocity sensor when the level of the specific frequency component is larger than the predetermined level.

With this abnormality detecting program, the computer can make a judgment as to whether or not the angular velocity sensor is in the abnormal condition.

Furthermore, the present invention provides a vehicle control system including an abnormality detecting apparatus that detects an abnormal condition of a vibration-type angular velocity sensor, an actuator that executes a brake control of the vehicle, and a vehicle stability control apparatus that manages the brake control executed by the actuator. The abnormality detecting apparatus including a frequency component extracting means for extracting a specific frequency component having the possibility that the angular velocity sensor may produce an erroneous output based on an acceleration signal detected by an acceleration sensor disposed in the vicinity of the vibration-type angular velocity sensor, and a judging means for comparing a level of the specific frequency component extracted by the frequency component extracting means with a predetermined level and producing a signal notifying an abnormal condition of the angular velocity sensor when the level of the specific frequency component is larger than the predetermined level. The vehicle stability control apparatus limits the brake control executed by the actuator when the vehicle stability control apparatus receives the signal notifying of the abnormal condition of the angular velocity sensor from the abnormality detecting apparatus.

With this arrangement, even when the angular velocity sensor is in the abnormal condition and produces an erroneous output, the abnormality detecting apparatus of the vibration-type angular velocity sensor detects the abnormal condition of the angular velocity sensor and notifies the vehicle stability control apparatus of the detected abnormal condition. Thus, it becomes possible to improve the safety of the vehicle control system, such as a brake control device for the wheels.

Furthermore, the present invention provides another abnormality detecting apparatus for a vibration-type angular velocity sensor that has a vibrator element driven at a predetermined resonance frequency and detects an angular velocity based on a displacement of the vibrator element in a sensing direction normal to a vibrating direction of the vibrator element. The abnormality detecting apparatus includes a first judging means for detecting a frequency at which the vibrator element causes a displacement in the sensing direction and checks whether or not the detected frequency is within a specific frequency range having the possibility that the angular velocity sensor may produce an erroneous output, and a second judging means for generating an abnormality signal when it is judged by the first judging means that the detected frequency is within the specific frequency range.

BRIEF DESCRIPTION OF THE DRAWINGS

The above and other objects, features and advantages of the present invention will become more apparent from the following detailed description which is to be read in conjunction with the accompanying drawings, in which:

FIG. 2 is a waveform diagram showing examples of an output signal Vs of a DC amplifier, an output signal Vs1 of a first BPF, an output signal Vs2 of a second BPF, and a logical sum of the output signals of first and second window comparators in accordance with the first embodiment of the present invention;

FIG. 3 is a block diagram showing a vehicle control system in accordance with the first embodiment of the present invention;

DESCRIPTION OF THE PREFERRED EMBODIMENTS

Preferred embodiments of the present invention will be explained hereinafter with reference to attached drawings.

First Embodiment

Hereinafter, a preferred embodiment of the present invention with respect to an abnormality detecting apparatus, an abnormality detecting method, and an abnormality detecting program for a vibration-type angular velocity sensor as well as a related vehicle control system will be explained with reference to the attached drawings.

Figure 1:
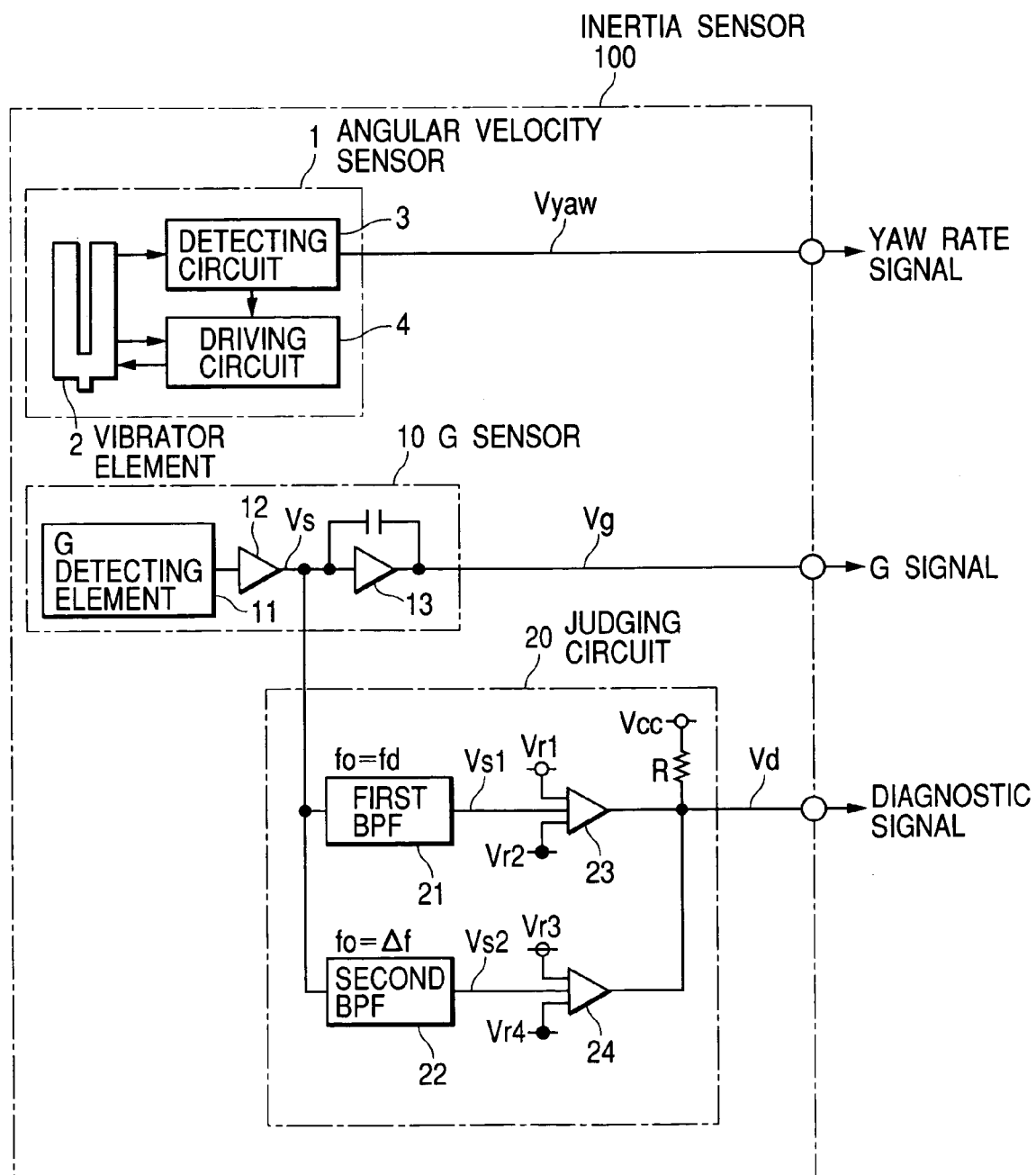
FIG. 1 is a circuit diagram showing an abnormality detecting apparatus for an angular velocity sensor in accordance with a first embodiment of the present invention.

FIG. 1 is a circuit diagram showing an abnormality detecting apparatus for an angular velocity sensor in accordance with a first embodiment of the present invention. An inertia sensor 100, mounted on a vehicle, includes an angular velocity sensor 1, a G sensor (i.e. acceleration sensor) 10, and a judging circuit 20 that are integrally installed in the same casing.

In recent years, to improve the installability or for the purpose of standardization, the angular velocity sensor 1 and the G sensor 10 tend to be installed together in a single casing as essential components for the vehicle control system so as to cooperatively function as the inertia sensor 100.

The angular velocity sensor 1 is composed of a vibrator element 2, a detecting circuit 3, and a driving circuit 4. For example, the vibrator element 2 is configured into a fork shape and driven by the driving circuit 4 that includes a piezoelectric driving element to cause the vibrator element 2 at a predetermined resonance frequency. When an angular velocity is input into the vibrator element 2, a Coriolis force is generated. The detecting circuit 3 including a piezoelectric sensing element detects a vibration component. The angular velocity is detected based on a displacement of the vibrator element 2 in a sensing direction normal to the vibrating direction of the vibrator element 2. The angular velocity sensor 1 generates a yaw rate signal Vyaw representing the detection result of the sensed vibration component. Regarding the detection of the angular velocity, the vibration-type angular velocity sensor is not limited to the above-described fork-shaped vibrator element 2 and accordingly any other vibrator element can be used. For example, a capacitor-type vibrator element manufactured by micromachining can be used.

The G sensor 10 is composed of a G detecting element 11, a DC amplifier 12, and a low-pass filter 13. The G detecting element 11 is, for example, being a voltage sensitive type, detects acceleration (i.e. G) when the acceleration is applied from the outside and generates an output voltage representing the detection result. To pick up the frequency components necessary for the vehicle control system, the DC amplifier 12 amplifies the output voltage of the G detecting element 11 and produces an output signal Vs. The low-pass filter 13 removes unnecessary high-frequency components from the output signal Vs of the DC amplifier 12 and outputs a G signal Vg.

Regarding the detection of acceleration, the G detecting element 11 is not limited to the above-described voltage sensitive type and accordingly can be constituted by a charge-sensitive type or any other type of detecting element. The present invention is not limited to any specific detection method. Furthermore, it is possible to arrange a single or a plurality of G sensors 10 to detect vibrations in the back-and-forth, right-and-left, and up-and-down directions, thereby realizing accurate acceleration detection.

Furthermore, the output signal Vs of the DC amplifier 12 is supplied to the judging circuit 20. Based on the entered output signal Vs, the judging circuit 20 extracts a specific vibration frequency component (e.g. a driving system resonance frequency fd, or a difference frequency $\Delta f=|fd-fs|$ between the driving system resonance frequency fd and a sensing system resonance frequency Fs) having the possibility that the angular velocity sensor 1 may produce an erroneous output. The judging circuit 20 includes a first band-pass filter 21 (hereinafter, referred to as first BPF 21), a second band-pass filter 22 (hereinafter, referred to as second BPF 22), a first window comparator 23, a second window comparator 24, and a pull-up resistor R.

The output signal Vs of the DC amplifier 12 is supplied to the first BPF 21 whose center frequency f0 is set to the driving system resonance frequency fd (i.e. f0=fd). The output signal Vs of the DC amplifier 12 is also supplied to the second BPF 22 whose center frequency f0 is set to the difference frequency $\Delta f$ (i.e. f0=$\Delta f$). The first BPF 21 extracts the frequency components in the vicinity of the driving system resonance frequency fd, and generates an output signal Vs1. Furthermore, the second BPF 22 extracts the frequency components in the vicinity of the difference frequency $\Delta f$, and generates an output signal Vs2. Namely, the first and second BPFs 21 and 22 respectively extract pre-designated frequency components from a supplied signal and cooperatively serve as frequency component extracting means of the present invention. According to this embodiment, the judging circuit 20 (i.e. first and second BPFs 21 and 22) extracts both of the driving system resonance frequency relating to the driving system of the angular velocity sensor and the difference frequency between the driving system resonance frequency and the sensing system resonance frequency. However, it is possible to detect either the driving system resonance frequency or the difference frequency from the output signal Vs of the DC amplifier 12. Furthermore, the judging circuit 20 can extract any other frequency component if there is the possibility that the angular velocity sensor may produce an erroneous output.

The output signal Vs1 of the first BPF 21 is supplied to the first window comparator 23 in which predetermined reference voltages Vr1 and Vr2(<Vr1) are set beforehand. The output signal Vs2 of the second BPF 22 is supplied to the second window comparator 24 in which predetermined reference voltage Vr3 and Vr4(<Vr3) are set beforehand. The first and second window comparators 23 and 24 function as a circuit for checking whether or not the voltage variation exceeds a predetermined range.

More specifically, as explained later with reference to FIG. 2, the first window comparator 23 detects the condition that the output signal Vs1 of the First BPF 21 satisfies the relationship Vs1>Vr1 or Vs1<Vr2, and the second window comparator 24 detects the condition that the output signal Vs2 of the second BPF 22 satisfies the relationship Vs2>Vr3 or Vs<Vr4. A sum of the outputs of first and second window comparators 23 and 24 is detectable as a logical sum (OR) appearing on the pull-up resistor R, and is output as a diagnostic signal Vd. The diagnostic signal Vd serves as a signal notifying of the abnormal condition of the angular velocity sensor 1.

The above-described judging circuit 20 operates in the following manner.

FIG. 2 is a waveform diagram showing examples of the output signal Vs of the DC amplifier 12, the output signal Vs1 of the first BPF 21, the output signal Vs2 of the second BPF 22, and the diagnostic signal Vd representing the logical sum (OR) of the output signals of first and second window comparators 23 and 24 in accordance with the first embodiment of the present invention.

The output signal Vs shown in FIG. 2 is a signal produced from the DC amplifier 12 and is a signal to be subsequently supplied to the low-pass filter 13 in the G sensor 10. The output signal Vs contains a high-frequency signal dependent on the frequency characteristics of the G detecting element 11. Needless to say, the output signal Vs contains the frequency components in the vicinity of the driving system resonance frequency fd (i.e. the frequency band of fd) or in the vicinity of the difference frequency $\Delta f$ between the driving system resonance frequency and the sensing system resonance frequency (i.e. the frequency band of $\Delta f$) where the angular velocity sensor may produce an erroneous output.

On the other hand, the output signal Vs1 is a signal produced from the first BPF 21 that extracts the frequency components adjacent to the frequency fd. The output signal Vs2 is a signal produced from the second BPF 22 that extracts the frequency components adjacent to the frequency $\Delta f$. In this case, the center frequency f0 of the first BPF 21 is set to the driving system resonance frequency fd of the angular velocity sensor and the center frequency f0 of the second BPF 22 is set to the difference frequency $\Delta f$ between the driving system resonance frequency and the sensing system resonance frequency of the angular velocity sensor. Accordingly, the output signal Vs1 has the frequency component in the vicinity of the driving system resonance frequency fd, and the output signal Vs2 has the frequency component in the vicinity of the difference frequency $\Delta f$ between the driving system resonance frequency and the sensing system resonance frequency of the angular velocity sensor.

The first window comparator 23 has a function of checking whether or not the output signal Vs1 exceeds a predetermined threshold value, while the second window comparator 24 has a function of checking whether or not the output signal Vs2 exceeds a predetermined threshold value. More specifically, the first window comparator 23 produces an output signal of Lo(GND) level when the output signal Vs1 is higher than the reference voltage Vr1 or lower than the reference voltage Vr2 and otherwise produces an output signal of Hi(Vcc) level. Similarly, the second window comparator 24 produces an output signal of Lo(GND) when the output signal Vs2 is higher than the reference voltage Vr3 or lower than the reference voltage Vr4 and otherwise produces an output signal of Hi(Vcc) level. The diagnostic signal Vd, representing the logical sum (OR) of the output signals of first and second window comparators 23 and 24, becomes an output signal of Lo(GND) level notifying of the abnormality of the angular velocity sensor when the driving system resonance frequency fd deviates from a predetermined range defined by the predetermined threshold levels or when the difference frequency $\Delta f$ between the driving system resonance frequency and the sensing system resonance frequency deviates from a predetermined range defined by the predetermined threshold levels.

In this manner, the judging circuit 20 detects the vibration corresponding to the frequency band of fd or the frequency band of $\Delta f$ in which there is the possibility the angular velocity sensor may produce an erroneous output due to vehicle vibration or the other influences when such vibration is entered into the angular velocity sensor 1. Then, the judging circuit 20 generates the diagnostic signal Vd representing the detection result. The diagnostic signal Vd is supplied to the vehicle control system to notify the abnormal condition of the angular velocity sensor 1.

FIG. 3 is a block diagram showing a vehicle control system in accordance with the first embodiment of the present invention. A vehicle control system 50 shown in FIG. 3 is composed of the above-described inertia sensor 100, a vehicle stability control apparatus 60 controlling the vehicle braking operation based on the yaw rate signal Vyaw and other signals, and an actuator 70 performing the wheel braking and driving operation (i.e. adjustment of wheel torque and braking amount). When the inertia sensor 100 notifies the vehicle stability control apparatus 60 of the abnormal condition of the angular velocity sensor 1, the vehicle stability control apparatus 60 interrupts the operation of the actuator 70 or executes other necessary controls. Thus, the first embodiment of the present invention can prevent the vehicle stabilization control from being adversely influenced by the abnormal condition of the angular velocity sensor 1.

Second Embodiment

Figure 4:
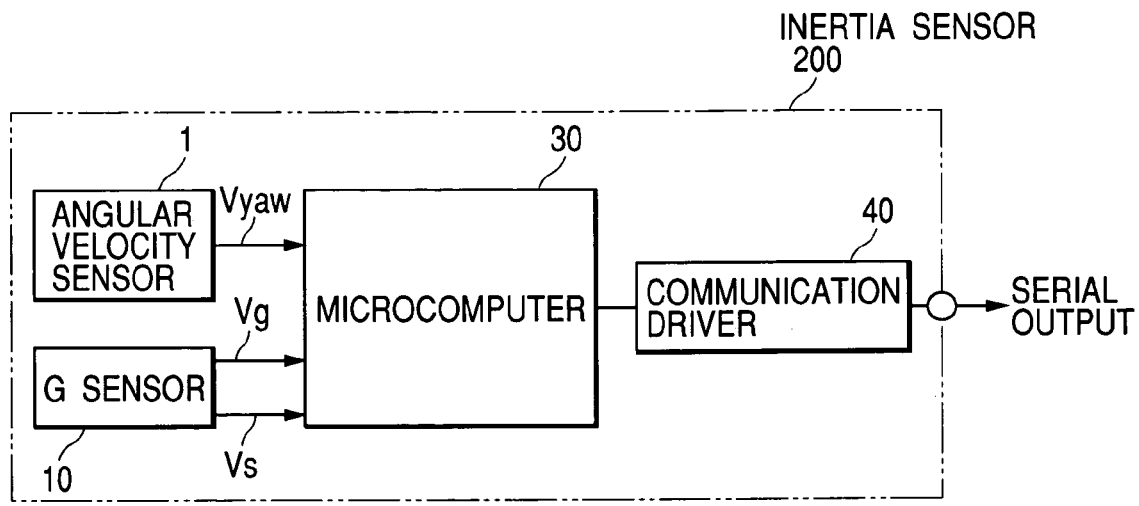
FIG. 4 is a block diagram showing an abnormality detecting apparatus for an angular velocity sensor in accordance with a second embodiment of the present invention.

Next, a second embodiment of the present invention will be explained. FIG. 4 is a block diagram showing an abnormality detecting apparatus for an angular velocity sensor in accordance with a second embodiment of the present invention. An inertia sensor 200, mounted on the vehicle, includes an angular velocity sensor 1, an acceleration (i.e. G) sensor 10, a microcomputer (i.e. a computer) 30, and a communication driver 40 that are integrally installed in the same casing. In recent years, for the purpose of standardization, there is the tendency that the inertia sensor 200 is required to output digital signals used, for example, in a CAN (Controller Area Network) or comparable serial communication system. Accordingly, the inertia sensor 200 incorporates the microcomputer 30 in addition to the angular velocity sensor 1 and the G sensor 10. Using the microcomputer 30 makes it possible to extract the frequency components by executing the software processing (software program) such as the FFT (i.e. Fast Fourier Transform) processing without adding any hardware circuit such as the judging circuit 20 of the first embodiment shown in FIG. 1.

The angular velocity sensor 1 and G sensor 10 of the second embodiment shown in FIG. 4 are identical with the angular velocity sensor 1 and the G sensor 10 of the first embodiment shown in FIG. 1. The yaw rate signal Vyaw of the angular velocity sensor 1 is supplied to an ADC (i.e. Analog Digital Converter) input terminal of the microcomputer 30. Similarly, the G signal Vg and the output signal Vs (hereinafter, referred to as G sensor signal Vs) of the G sensor 10 are supplied to ADC input terminals of the microcomputer 30. The microcomputer 30 executes the frequency analysis on the signal Vsd (i.e. digitized signal of the G sensor signal Vs) that has a digital value obtained through software sampling processing.

Then, the microcomputer 30 extracts the frequency component having the possibility that the angular velocity sensor 1 may produce an erroneous output, and causes the communication driver 40 to notify the vehicle control system of the abnormal condition of the angular velocity sensor 1 via the serial communication system. When the vehicle control system receives this notification, the vehicle stability control apparatus 60 interrupts the operation of the actuator 70 or executes other necessary controls. As explained in the first embodiment, the vehicle stability control apparatus 60 controls the vehicle braking operation based on the yaw rate signal Vyaw and other signals, and the actuator 70 performs the wheel braking and driving operation (i.e. adjustment of wheel torque and braking amount). Thus, the second embodiment of the present invention can prevent the vehicle stabilization control from being adversely influenced by the abnormal condition of the angular velocity sensor 1.

Next, the algorithm used in the software processing executed in the microcomputer 30 will be explained.

Figure 5:
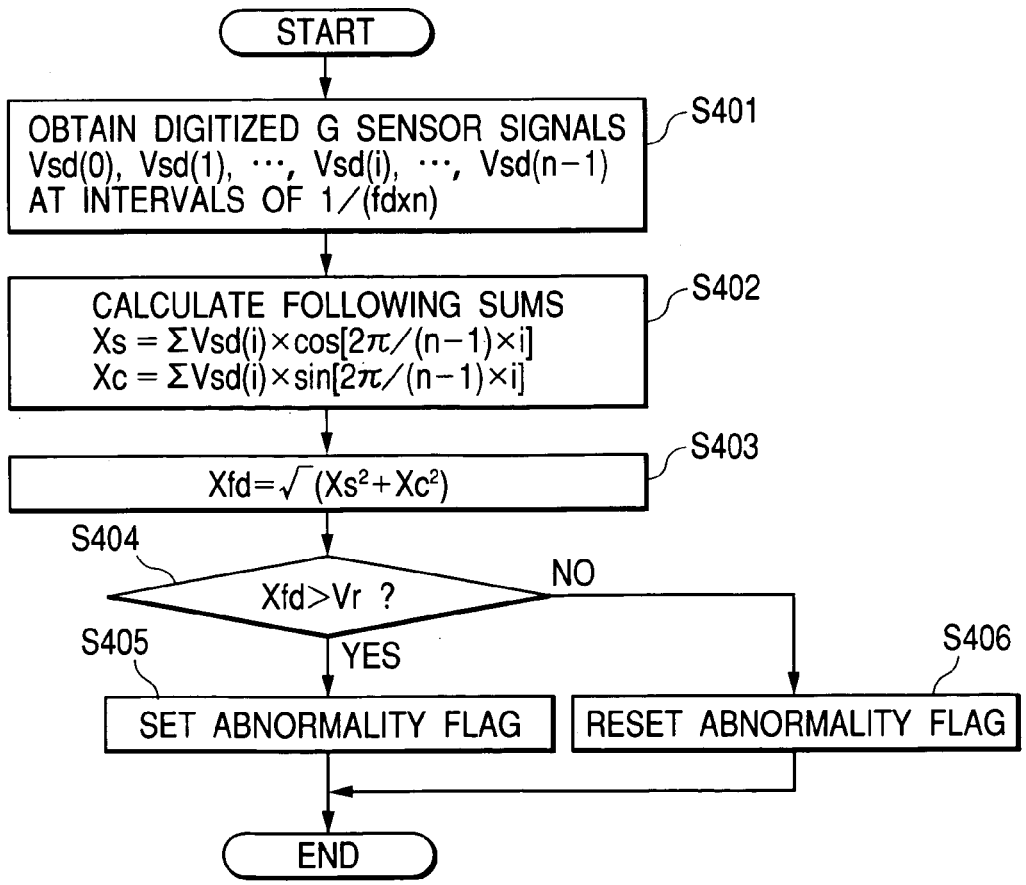
FIG. 5 is a flowchart showing one example of the algorithm used in the software processing executed in a microcomputer in accordance with the second embodiment of the present invention.
Figure 6:
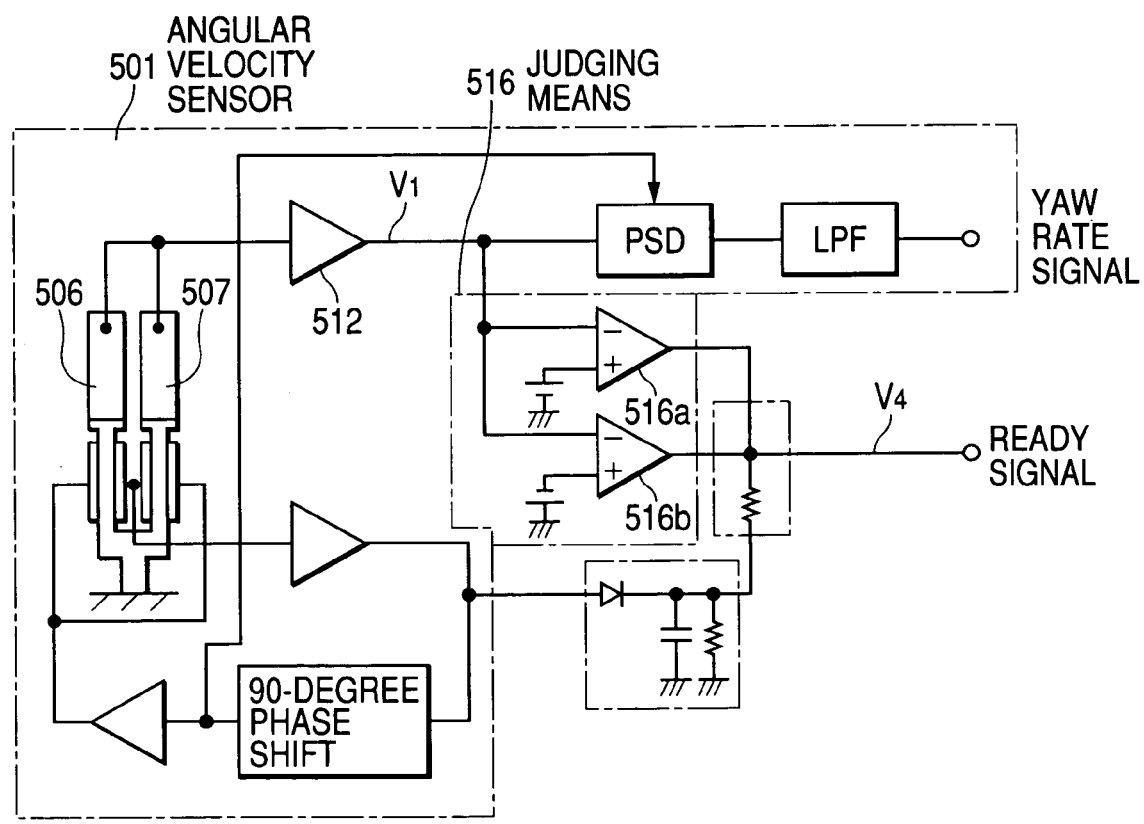
FIG. 6 is a circuit diagram showing one example of a conventional angular velocity sensor and its peripheral circuit arrangement.

FIG. 5 is a flowchart showing one example of the algorithm used in the software processing executed in the microcomputer 30 in accordance with the second embodiment of the present invention.

In step S401, the G sensor signal Vs is AD converted at the intervals of 1/(fd×n) sec to obtain a total of n data of Vsd(0), Vsd(1), ..., Vsd(1), ..., and Vsd(n−1) with respect to the signal Vsd that is a digitized signal of the G sensor signal Vs. More specifically, the period of the frequency fd (i.e. 1/fd) sec is divided into a total of n time slots and the intensity of the signal Vsd in each divided time slot is obtained.

Then, in step S402, the calculation based on the following equations (A) and (B) is executed to obtain Xs and Xc as a sum of multiplying the n data of Vsd(0) to Vsd(n−1) with the sine and cosine data of one complete period.

$$Xs = \Sigma Vsd(i) \times \cos[2\pi/(n-1) \times i] \quad (A)$$

$$Xc = \Sigma Vsd(i) \times \sin[2\pi/(n-1) \times i] \quad (B)$$

Furthermore, in step S403, the calculation based on the following equation (C) is executed to obtain Xfd as a square root of the sum of $Xs^2$ and $Xc^2$, thereby calculating the magnitude Xfd of the frequency fd component contained in the G sensor signal Vs.

$$Xfd = \sqrt{(X_S^2 + X_C^2)} \quad (C)$$

Then, in step S404, the calculate Xfd is compared with a predetermined value Vr. When the relationship Xfd>Vr is satisfied (i.e. YES in step S404), it is judged that the vibration having the frequency band of the frequency fd is input into the angular velocity sensor 1 and accordingly an abnormality flag is set in step S405. On the other hand, when the relationship Xfd≦Vr is satisfied (i.e. NO in step S404), the abnormality flag is reset in step S406. In this manner, through the algorithm used by the microcomputer 30, the second embodiment makes it possible to calculate the signal equivalent to the diagnostic signal of the first embodiment (i.e. a signal notifying of the abnormal condition of the angular velocity sensor).

The second embodiment of the present invention is not limited to the above-described algorithm and accordingly any other algorithm can be used to detect the abnormal condition of the angular velocity sensor 1 based on the G sensor signal Vs. For example, it is possible to replace the judging circuit 20 of the first embodiment with the comparable software processing. The band-pass filter having the center frequency equivalent to the frequency fd can be replaced with a digital filter based on the software processing. According to this system, the output value is compared with a regulated value to make a judgment as to whether or not the angular velocity sensor 1 is in the abnormal condition.

Furthermore, it is possible to combine the hardware processing disclosed in the first embodiment and the software processing disclosed in the second embodiment. For example, it is possible to use the first and second BPFs 21 and 22 shown in FIG. 1 to extract the specific frequency component and use the microcomputer 30 shown in FIG. 4 to judge the level of extracted frequency component.

In any way, the present invention can be realized by the hardware arrangement as explained in the first embodiment and also realized by the software arrangement as explained in the second embodiment. According to the above-described first embodiment, the angular velocity sensor 1, the G sensor 10, and the judging circuit 20 are installed in the same inertia sensor 100. According to the above-described second embodiment, the angular velocity sensor 1, the G sensor 10, and the microcomputer 30 are installed in the same inertia sensor 200. Alternatively, it is possible to independently dispose respective constituent parts or components. However, it is desirable that the angular velocity sensor 1 and the G sensor 10 are disposed adjacent to each other to effectively detect the abnormal condition of the angular velocity sensor 1 based on the signal of the G sensor 10. In this respect, incorporating the angular velocity sensor 1 and the G sensor 10 in a single casing is ideal.

As explained above, the present invention extracts the specific frequency component having the possibility that the angular velocity sensor may produce an erroneous output based on an output of the G sensor 10 and judges that the angular velocity sensor 1 is in an abnormal condition when the level of the specific frequency component exceeds a predetermined level. Thus, it becomes possible to improve the safety of the vehicle control system and simplify the vibration-proof structure of the angular velocity sensor 1.

What is claimed is:

1. An abnormality detecting apparatus for detecting an abnormal condition of a vibration-type angular velocity sensor, the apparatus comprising:

frequency component extracting means for extracting, from a predetermined signal, a specific frequency component determined based on at least one of a driving system resonance frequency related to a driving system of said angular velocity sensor and a sensing system resonance frequency related to a sensing system of said angular velocity sensor, said angular velocity sensor capable of producing an erroneous output when receiving said specific frequency component of the predetermined signal; and judging means for comparing a level of said specific frequency component extracted by said frequency component extracting means with a predetermined level and outputting a signal notifying of an abnormal condition of said angular velocity sensor when the level of said specific frequency component is larger than said predetermined level.

2. The abnormality detecting apparatus in accordance with claim 1, wherein said specific frequency component includes one or more of: the driving system resonance frequency and a difference frequency between said driving system resonance frequency and the sensing system resonance frequency.

3. The abnormality detecting apparatus in accordance with claim 1, wherein the predetermined signal includes an acceleration signal detected by an acceleration sensor disposed in the vicinity of said vibration-type angular velocity sensor.

4. The abnormality detecting apparatus in accordance with claim 3, wherein said vibration-type angular velocity sensor and said acceleration sensor are installed in the same casing.

5. An abnormality detecting method for detecting an abnormal condition of a vibration-type angular velocity sensor, the method comprising the steps of:

extracting, from a predetermined signal, a specific frequency component determined based on at least one of a driving system resonance frequency related to a driving system of said angular velocity sensor and a sensing system resonance frequency related to a sensing system of said angular velocity sensor, said angular velocity sensor capable of producing an erroneous output when receiving said specific frequency component of the predetermined signal;

comparing a level of said specific frequency component extracted in said frequency component extracting step with a predetermined level and producing a signal notifying of an abnormal condition of said angular velocity sensor when the level of said specific frequency component is larger than said predetermined level; and outputting said signal notifying of the abnormal condition of said angular velocity sensor when the level of said specific frequency component is larger than said predetermined level.

6. The abnormality detecting method in accordance with claim 5, wherein said specific frequency component includes one or more of the driving system resonance frequency and a difference frequency between said driving system resonance frequency and the sensing system resonance frequency.

7. The abnormality detecting method in accordance with claim 5, wherein said steps are executed by at least one of an electric circuit having the capability of executing hardware processing and a computer having the capability of executing software processing.

8. The abnormality detecting method in accordance with claim 5, wherein the predetermined signal includes an acceleration signal detected by an acceleration sensor disposed in the vicinity of said vibration-type angular velocity sensor.

9. The abnormality detecting method in accordance with claim 8, wherein said vibration-type angular velocity sensor and said acceleration sensor are installed in the same casing.

10. An abnormality detecting program executed in a computer for detecting an abnormal condition of a vibration-type angular velocity sensor, said abnormality detecting method comprising the steps of:

extracting, from a predetermined signal, a specific frequency component determined based on at least one of a driving system resonance frequency related to a driving system of said angular velocity sensor and a sensing system resonance frequency related to a sensing system of said angular velocity sensor, said angular velocity sensor capable of producing an erroneous output when receiving said specific frequency component of the predetermined signal;

comparing a level of said specific frequency component extracted in said frequency component extracting step with a predetermined level and producing a signal notifying of an abnormal condition of said angular velocity sensor when the level of said specific frequency component is larger than said predetermined; and outputting said signal notifying of the abnormal condition of said angular velocity sensor when the level of said specific frequency component is larger than said predetermined level.

11. A vehicle control system comprising an abnormality detecting apparatus that detects an abnormal condition of a vibration-type angular velocity sensor, an actuator that executes a brake control of a vehicle and a vehicle stability control apparatus that manages said brake control executed by said actuator, wherein:

said abnormality detecting apparatus comprises:

frequency component extracting means for extracting, from a predetermined signal, a specific frequency component determined based on at least one of a driving system resonance frequency related to a driving system of said angular velocity sensor and a sensing system resonance frequency related to a sensing system of said angular velocity sensor, said angular velocity sensor capable of producing an erroneous output when receiving said specific frequency component of the predetermined signal; and judging means for comparing a level of said specific frequency component extracted by said frequency component extracting means with a predetermined level and outputting a signal notifying of an abnormal condition of said angular velocity sensor when the level of said specific frequency component is larger than said predetermined level, and said vehicle stability control apparatus limits said brake control executed by said actuator when said vehicle stability control apparatus receives said signal notifying of the abnormal condition of said angular velocity sensor from said abnormality detecting apparatus.

12. An abnormality detecting apparatus for a vibration-type angular velocity sensor that has a vibrator element driven at a predetermined resonance frequency and detects an angular velocity based on a displacement of said vibrator element in a sensing direction normal to a vibrating direction of said vibrator element, comprising:

first judging means for detecting a frequency at which said vibrator element causes a displacement in said sensing direction and checks whether or not the detected frequency is within a specific frequency range determined based on at least one of the predetermined resonance frequency of the vibrator element along said vibration direction and a sensing system resonance frequency of the vibrator element along said sensing direction, said angular velocity sensor capable of producing an erroneous output when receiving a specific frequency component of the specific frequency range; and second judging means for outputting an abnormality signal when it is judged by said first judging means that the detected frequency is within said specific frequency range.

* * * * *